(12) United States Patent
Marcy

(10) Patent No.: US 6,416,073 B1
(45) Date of Patent: Jul. 9, 2002

(54) CAMPER TRAILER HITCH CONVERSION SYSTEM

(75) Inventor: Dewey R. Marcy, Greeley, CO (US)

(73) Assignee: Quick-Hitch, Inc., Greeley, CO (US)

( * ) Notice: Subject to any disclaimer, the term of this patent is extended or adjusted under 35 U.S.C. 154(b) by 0 days.

(21) Appl. No.: 09/526,302

(22) Filed: Mar. 15, 2000

Related U.S. Application Data

(60) Provisional application No. 60/129,329, filed on Apr. 14, 1999.

(51) Int. Cl.$^7$ ................................................ B60D 1/07
(52) U.S. Cl. .................................. 280/416.1; 280/415.1
(58) Field of Search ........................... 280/415.1, 416.1, 280/417.1, 511

(56) References Cited

U.S. PATENT DOCUMENTS 5,513,869 A * 5/1996 Putnam .................... 280/415.1
6,135,482 A * 10/2000 Larkin ...................... 280/416.1

* cited by examiner

Primary Examiner—J. J. Swann
Assistant Examiner—L. Lum
(74) Attorney, Agent, or Firm—Dean P. Edmundson

(57) ABSTRACT

A conversion system for enabling a camper trailer with a king pin to be towed by a vehicle having a ball-type hitch. The system includes a clamp comprising two U-shaped members adapted to be fitted around the king pin of the trailer, a plate which is connected to the U-shaped members, a neck which is connected to the plate, and a socket at the lower end of the neck for connection to a conventional ball-type hitch. The conversion system can be attached to any conventional gooseneck camper trailer without modifying or damaging the trailer or the hitch. Then the camper trailer can be towed by a truck with a conventional ball-type hitch.

3 Claims, 3 Drawing Sheets

CAMPER TRAILER HITCH CONVERSION SYSTEM

CROSS-REFERENCE TO RELATED APPLICATION

This application is based upon, and claims the benefit of, my Provisional Application No. 60/129,329, filed Apr. 14, 1999.

FIELD OF THE INVENTION

This invention relates to hitch systems. More particularly, this invention relates to camper trailer hitch systems.

BACKGROUND OF THE INVENTION

A typical camper trailer utilizes a king pin at its forward end. In order to connect the trailer to a towing vehicle (e.g., a pickup truck), the towing vehicle must include a specialized type of hitch which has a spring-loaded latch for coupling to the king pin. Thus, in order to tow a conventional camper trailer of the type having a king pin, it is necessary for the towing vehicle to have the specialized type of hitch which is capable of coupling to the king pin. This type of hitch is rather large and bulky.

A conventional gooseneck trailer (e.g., stock trailer, large flatbed, horse trailer, etc.) includes a neck portion with a socket designed to fit over, and connect to, a ball-type hitch in a towing vehicle (e.g., a pickup truck). The ball hitch allows for more rotational freedom between the towing vehicle and the trailer (i.e., the trailer and the towing vehicle can be in two different planes without damaging the trailer or the hitch). Thus, use of a ball-type hitch enables the truck and trailer to be used off-road.

There has not heretofore been provided a simple conversion system for enabling a conventional camper trailer to be towed by a truck with a ball-type hitch without permanent modification of the camper trailer hitch.

SUMMARY OF THE INVENTION

In accordance with the present invention there is provided a conversion system which can be detachably mounted or connected to the king pin of a camper trailer which enables the trailer to be towed by a vehicle having a ball-type hitch. In a preferred embodiment, the conversion system comprises:

(a) clamp means comprising first and second U-shaped members adapted to be fitted around the king pin;
(b) plate means bolted to said U-shaped members;
(c) a neck member attached to said plate means;
(d) a socket at the lower end of the neck member for connection to a conventional ball-type hitch in a towing vehicle.

The conversion system of this invention is not welded to the camper trailer, nor is it necessary to drill holes in the existing hitch of the camper trailer. In other words, no permanent modification of the camper trailer is required.

The conversion system can be used on any conventional camper trailer which has a king pin. It can be readily and easily attached to the camper trailer king pin, and it can also be easily detached again, if desired.

The conversion system enables a pickup truck having a ball-type hitch to be used for towing conventional gooseneck trailers and can also be used for towing camper trailers, without modification of the truck and without permanent modification of the camper trailer.

Other features and advantages of the conversion system of the invention will be apparent from the following detailed description and the accompanying drawings.

BRIEF DESCRIPTION OF THE DRAWINGS

The invention is described in more detail hereafter with reference to the accompanying drawings, wherein like reference characters refer to the same parts throughout the several views and in which.

DETAILED DESCRIPTION OF THE INVENTION

Figure 1:
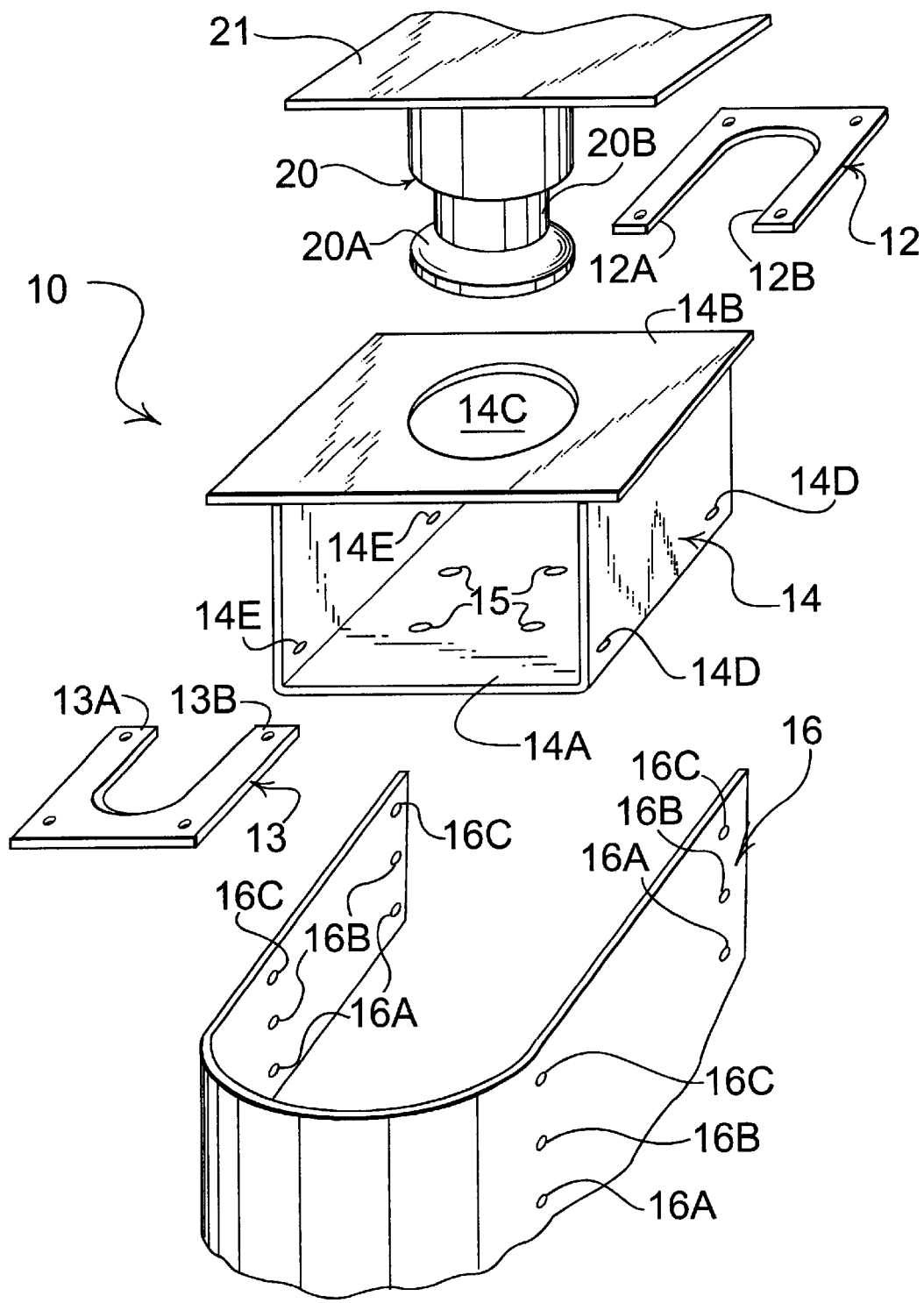
FIG. 1 is an explosion view illustrating a preferred embodiment of the invention.

The conversion system 10 of the invention is illustrated in the drawings for attachment to a vertically-oriented king pin 20 carried by a horizontal plate 21 at the front of a camper trailer. The king pin includes a section 20B of reduced diameter and an annular shoulder or flange 20A at its lower end (having a diameter approximately equal to that of the upper portion of the king pin).

The conversion system includes two U-shaped clamp members 12 and 13. The spacing between the parallel arms 12A and 12B, and 13A and 13B, is slightly greater than the diameter of the section 20B and is less than the diameter of the flange 20A.

To attach the conversion system or adaptor 10 to a king pin 20, the plate member 14 (having opening 14C in its top surface) is initially positioned over the king pin so that U-shaped members 12 and 13 can be positioned around the king pin (from opposite sides of the king pin). Then bolts 18 are inserted through the openings 15 in the bottom of the plate member 14 and then through registering openings in U-shaped members 12 and 13. When bolts 18 are tightened, plate member 14 is drawn upwardly against plate 21 on the trailer. As a result, the member 14 is very tightly secured against plate 21 and will not move during use.

Then U-shaped neck member 16 is bolted to opposite sides of member 14 (using bolts 17 through holes 14D and 14E in member 14 and either holes 16A, 16B or 16C in the neck member 16, depending upon the length of neck 16 needed for a particular towing vehicle).

Figure 2:
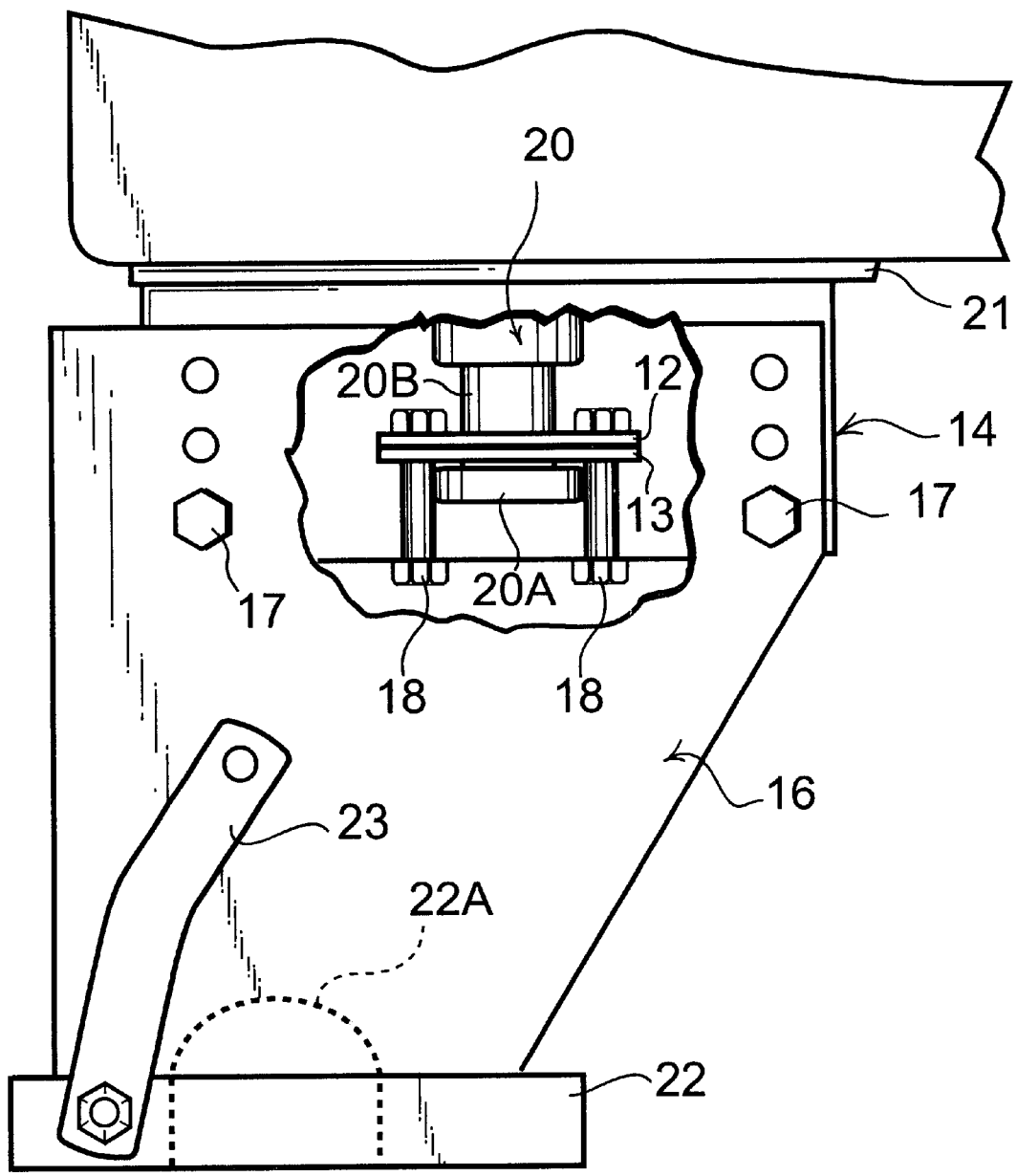
FIG. 2 is a side elevational view, partially cut-away, showing the conversion system of the invention connected to the king pin of a camper trailer.

FIG. 2 is a side elevational view of the conversion system after installation on the king pin of a camper trailer, partially cut away to show the clamp members 12 and 13 and bolts 18. At the lower end of the neck portion 16 there is a base member 22 (having a recess or socket 22A therein for receiving the ball of a conventional ball-type hitch on a towing vehicle). A latch lever 23 is for releasing the hitch from the ball in the towing vehicle when desired. Other types of latch mechanisms may also be used.

Figure 3:
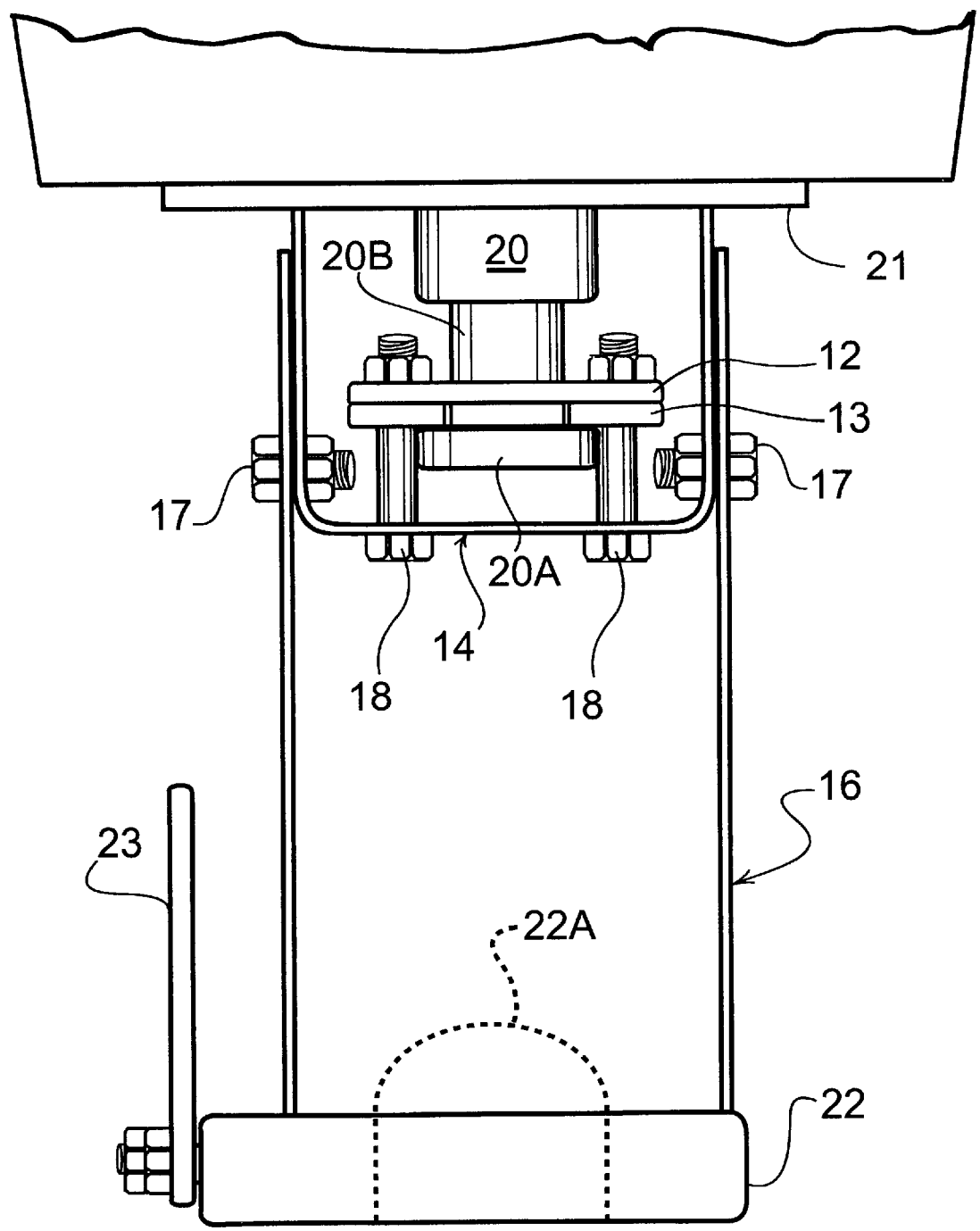
FIG. 3 is a rear elevational view of the conversion system shown in FIG. 2.

FIG. 3 is a rear elevational view of the conversion system shown in FIGS. 1 and 2.

No modifications to the existing camper trailer are required when using the system of this invention. No welding or drilling of camper trailer is necessary. The system can also be easily taken off the camper trailer when desired.

Other variants are possible without departing from the scope of the invention. For example, it is possible to include appropriate safety chains which can be connected at one end to the trailer (or to the neck portion of the hitch) and can be connected at the opposite end to the towing vehicle.

What is claimed is:

1. A conversion system for enabling a camper trailer with a king pin extending downwardly from a mounting plate to be towed by a vehicle having a ball hitch, the system comprising:

(a) a box member having a top plate with an opening therein through which said king pin is inserted, a bottom plate with openings therethrough, and opposing side walls extending between said top plate and said bottom plate;

(b) clamp means comprising first and second U-shaped members fitted around and in engagement with said king pin after said king pin has been inserted through said opening in said top plate; wherein said U-shaped members include a plurality of registering openings therethrough;

(c) a plurality of bolts extending through said openings in said bottom plate and through said registering openings in said U-shaped members;

(d) a neck member attached to said box member and including a lower end; and (e) a socket at said lower end of said neck member for connection to said ball hitch in said vehicle;

wherein when said bolts are tightened, said U-shaped members exert downward force on said king pin, and said top plate of said box member is urged upwardly against said mounting plate for said king pin.

2. A system in accordance with claim 1, wherein said neck member is bolted to said opposing walls of said box member.

3. A system in accordance with claim 2, wherein said neck member includes a plurality of vertically spaced holes to enable said neck member to be bolted to said box member at a plurality of locations.

* * * * *